US012596427B2

(12) United States Patent
Shin

(10) Patent No.: US 12,596,427 B2
(45) Date of Patent: Apr. 7, 2026

(54) REWARD GENERATING METHOD FOR REDUCING PEAK LOAD OF POWER CONSUMPTION AND COMPUTING DEVICE FOR PERFORMING THE SAME

(71) Applicant: ELECTRONICS AND TELECOMMUNICATIONS RESEARCH INSTITUTE, Daejeon (KR)

(72) Inventor: Cheol-ho Shin, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 564 days.

(21) Appl. No.: 18/140,726

(22) Filed: Apr. 28, 2023

(65) Prior Publication Data

US 2024/0103603 A1 Mar. 28, 2024

(30) Foreign Application Priority Data

Sep. 28, 2022 (KR) ........................ 10-2022-0123709

(51) Int. Cl.
G06F 1/3296 (2019.01)
G06N 20/00 (2019.01)

(52) U.S. Cl.
CPC ........... G06F 1/3296 (2013.01); G06N 20/00 (2019.01)

(58) Field of Classification Search
None
See application file for complete search history.

(56) References Cited

U.S. PATENT DOCUMENTS

2020/0295566 A1 9/2020 Nam et al.
2022/0146996 A1 5/2022 Shin
2023/0213907 A1* 7/2023 Han ..................... G05B 19/042
700/291

FOREIGN PATENT DOCUMENTS

KR 10-1836439 B1 3/2018
KR 10-2018-0101147 A 9/2018
KR 10-2019-0005456 A 1/2019
(Continued)

OTHER PUBLICATIONS

Yeongung Seo et al., "ESS Operation Scheduling Scheme Using LSTM for Peak Demand Reduction", Journal of KIISE, vol. 46, No. 11, pp. 1165-1173, 2019. 11.
(Continued)

*Primary Examiner* — Clifford Hilaire
(74) *Attorney, Agent, or Firm* — LRK PATENT LAW FIRM

(57) ABSTRACT

A reward generating method for reducing peak load of power consumption and a computing device for performing the same are provided. The reward generating method for reducing the peak load of the power consumption includes calculating an energy index according to a predetermined time interval using power consumption data of a specific building, to which an energy storage system (ESS) is applied, during a predetermined period, determining a reward index according to an action of the ESS using a reward function generated based on the energy index, and training a training model to which the reward function is applied through a reward generated based on the reward index.

20 Claims, 11 Drawing Sheets

(56)     References Cited

FOREIGN PATENT DOCUMENTS

KR     10-2021-0075848 A     6/2021
KR     10-2022-0061709 A     5/2022

OTHER PUBLICATIONS

Se-Heon Lim et al., "Reinforcement Learning-based ESS Scheduling for Cost Minimization", The Korean Institute of Electrical Engineers(KIEE), Nov. 7, 2019.

* cited by examiner

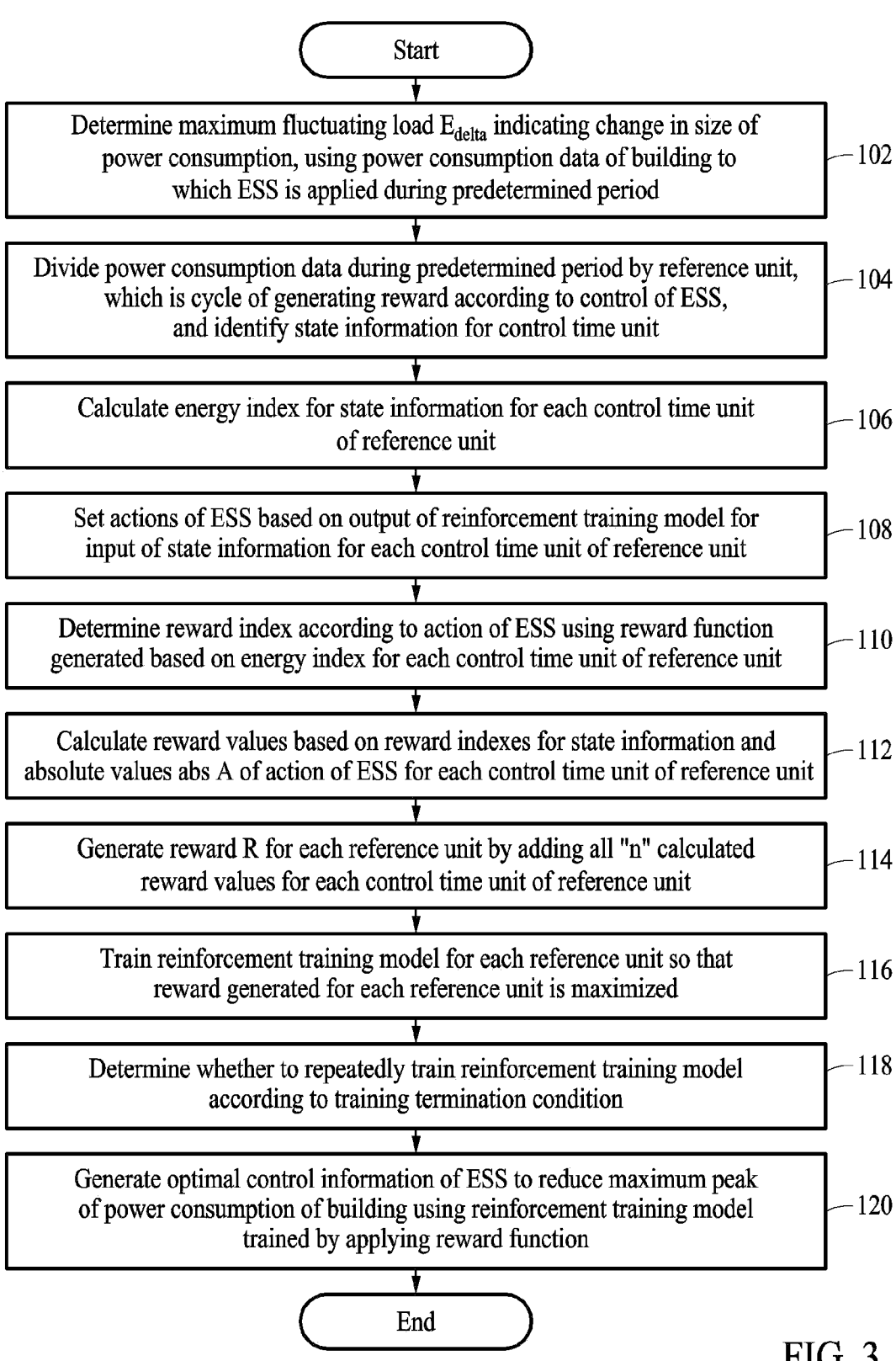

Start

Determine maximum fluctuating load $E_{delta}$ indicating change in size of power consumption, using power consumption data of building to which ESS is applied during predetermined period — 102

Divide power consumption data during predetermined period by reference unit, which is cycle of generating reward according to control of ESS, and identify state information for control time unit — 104

Calculate energy index for state information for each control time unit of reference unit — 106

Set actions of ESS based on output of reinforcement training model for input of state information for each control time unit of reference unit — 108

Determine reward index according to action of ESS using reward function generated based on energy index for each control time unit of reference unit — 110

Calculate reward values based on reward indexes for state information and absolute values abs A of action of ESS for each control time unit of reference unit — 112

Generate reward R for each reference unit by adding all "n" calculated reward values for each control time unit of reference unit — 114

Train reinforcement training model for each reference unit so that reward generated for each reference unit is maximized — 116

Determine whether to repeatedly train reinforcement training model according to training termination condition — 118

Generate optimal control information of ESS to reduce maximum peak of power consumption of building using reinforcement training model trained by applying reward function — 120

End

FIG. 3

REWARD GENERATING METHOD FOR REDUCING PEAK LOAD OF POWER CONSUMPTION AND COMPUTING DEVICE FOR PERFORMING THE SAME

CROSS-REFERENCE TO RELATED APPLICATION

This application claims the benefit of Korean Patent Application No. 10-2022-0123709 filed on Sep. 28, 2022, in the Korean Intellectual Property Office, the entire disclosure of which is incorporated herein by reference for all purposes.

BACKGROUND

1. Field of the Invention

One or more embodiments relate to a reward generating method for reducing peak load of power consumption and a computing device for performing the same, and more specifically, to a method of controlling an action of an energy storage system (ESS) to manage peak load of power consumption of a building.

2. Description of Related Art

As a conventional method of managing demand using an energy storage system (ESS), a scheduling control method has been mainly used. The scheduling control method charges power energy during the light load time and discharges power energy during the peak load time by considering a predetermined seasonal load time in order to reduce peak load of power consumption.

However, the seasonal load time is suggested by the necessity on a power supplier's side and does not consider the actual peak load time of individual buildings, towns, or cities.

The actual peak load of the power consumption of an individual building may be reduced by an expert's analysis of monitored power consumption data considering various uses and the like and performing appropriate control of ESS considering the capacity and the charging/discharging amount of the ESS.

However, a power consumption pattern may vary from building to building, and even in the same building, peak load time fluctuations may occur in accordance with seasonal changes. Since a power usage condition may vary from building to building and the power consumption pattern may change depending on the season, it may be a very difficult task to always perform optimal control of the ESS suitable for various power consumption patterns through the expert's analysis of the power consumption monitored in the building.

SUMMARY

One or more embodiments provide a method and device for generating optimal control information of an energy storage system (ESS) to reduce peak load of power consumption without help of an expert by using a reinforcement training model that uses power consumption data monitored in a building as an input.

However, the technical aspects are not limited to the aforementioned aspects, and other technical aspects may be present.

According to an aspect, there is provided a reward generating method for reducing peak load of power consumption including calculating an energy index according to a predetermined time interval using power consumption data of a specific building, to which an ESS is applied, during a predetermined period, determining a reward index according to an action of the ESS using a reward function generated based on the energy index, and training a training model to which the reward function is applied through a reward generated based on the reward index.

The determining of the reward index may include determining the reward index according to a same time interval for calculating the energy index through the reward function generated by setting the reward index so that a charging action of the ESS is a loss and a discharging action of the ESS is a gain, for the energy index.

The reward function may be set so that a loss of the reward index increases when the energy index increases in the charging action of the ESS, that a gain of the reward index increases when the energy index increases in the discharging action of the ESS, and that the reward index remains at 0 regardless of the energy index in a standby action of the ESS.

The determining of the reward index may include determining the reward index according to a same time interval for calculating the energy index through the reward function generated by setting the reward index so that both a charging action and a discharging action of the ESS are a gain, for the energy index.

The reward function may be set so that a gain of the reward index decreases when the energy index increases in the charging action of the ESS, that a gain of the reward index increases when the energy index increases in the discharging action of the ESS, and that the reward index remains at 0 regardless of the energy index in the standby action of the ESS.

The calculating of the energy index may include calculating an energy index corresponding to a specific time period using a maximum fluctuating load, a minimum load, and power consumption during the specific time period identified in the power consumption data during a predetermined period.

The training of the training model may include calculating reward values according to the predetermined time interval based on the reward index determined according to the predetermined time interval and an absolute value of the action of the ESS corresponding to the determined reward index, generating a reward for each reference unit by dividing and adding the calculated reward values according to the reference unit, and repeatedly training the training model so that the reward generated for each reference unit is maximized.

The repeated training of the training model may include training the training model so that all rewards generated for each reference unit are maximized and terminating the training of the training model.

The repeated training of the training model may include, when the reward trained to be maximized through the training model does not increase for a predetermined reference unit, terminating the training of the training model.

The reward generating method for reducing peak load of power consumption may further include generating optimal control information of the ESS to reduce a maximum peak of the power consumption of the specific building, based on action information of the ESS that is output by inputting state information to the trained training model to which the reward function is applied, wherein the state information may include information about at least one of date and time, the power consumption data of the specific building, a remaining energy amount of the ESS, or a temperature of the region where the ESS is located.

According to another aspect, there is provided a computing device including a processor, a memory configured to load a program executed by the processor, and a storage configured to store the program, wherein the program includes instructions to cause the processor to perform calculating an energy index according to a predetermined time interval using power consumption data of a specific building, to which an ESS is applied, during a predetermined period, determining a reward index according to an action of the ESS using a reward function generated based on the energy index, and training a training model to which the reward function is applied through a reward generated based on the reward index.

The processor may be configured to determine the reward index according to a same time interval for calculating the energy index through the reward function generated by setting the reward index so that a charging action of the ESS is a loss and a discharging action of the ESS is a gain, for the energy index.

The reward function may be set so that a loss of the reward index increases when the energy index increases in the charging action of the ESS, that a gain of the reward index increases when the energy index increases in the discharging action of the ESS, and that the reward index remains at 0 regardless of the energy index in a standby action of the ESS.

The processor may be configured to determine the reward index according to a same time interval for calculating the energy index through the reward function generated by setting the reward index so that both a charging action and a discharging action of the ESS are a gain, for the energy index.

The reward function may be set so that a gain of the reward index decreases when the energy index increases in the charging action of the ESS, a gain of the reward index increases when the energy index increases in the discharging action of the ESS, and that the reward index remains at 0 regardless of the energy index in the standby action of the ESS.

The processor may be configured to calculate an energy index corresponding to a specific time period using a maximum fluctuating load, a minimum load, and power consumption during the specific time period identified in the power consumption data during a predetermined period.

The processor may be configured to calculate reward values according to the predetermined time interval based on the reward index determined according to the predetermined time interval and an absolute value of the action of the ESS corresponding to the determined reward index, generate a reward for each reference unit by dividing and adding the calculated reward values according to the reference unit, and train the training model repeatedly so that the reward generated for each reference unit is maximized.

The processor may be configured to train the training model so that all rewards generated for each reference unit are maximized and terminate the training of the training model.

The processor may be configured to, when the reward trained to be maximized through the training model does not increase for a predetermined reference unit, terminate the training of the training model.

The processor may be configured to generate optimal control information of the ESS to reduce a maximum peak of the power consumption of the specific building, based on action information of the ESS that is output by inputting state information to the trained training model to which the reward function is applied, wherein the state information may include information about at least one of date and time, the power consumption data of the specific building, a remaining energy amount of the ESS, or a temperature of the region where the ESS is located.

Additional aspects of embodiments will be set forth in part in the description which follows and, in part, will be apparent from the description, or may be learned by practice of the disclosure.

According to embodiments, the optimal control information of the ESS to reduce the peak load of the power consumption without help of an expert by using a reinforcement training model that uses the power consumption data monitored in a building as an input may be generated.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is a flowchart illustrating a reinforcement training process according to an embodiment;

DETAILED DESCRIPTION

Figures 1, 2:
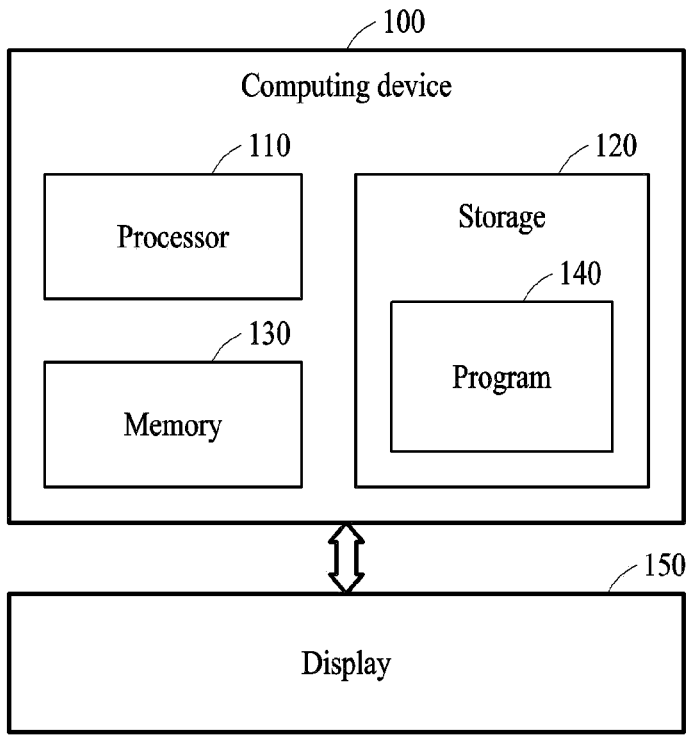
FIG. 1 illustrates a configuration of a computing device according to an embodiment.
FIG. 2 is a diagram illustrating a structure of a reinforcement training technique applied to a training model according to an embodiment.

The following structural or functional descriptions of embodiments described herein are merely intended for the purpose of describing the embodiments described herein and may be implemented in various forms. Thus, actual form of implementation is not limited to the embodiments described herein, and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, and similarly, the second component may be referred to as the first component within the scope of the present disclosure.

When it is mentioned that one component is "connected" to another component, it may be understood that the one component is directly connected or coupled to another component or still another component is interposed between the two components.

As used herein, the singular forms "a," "an," and "the" are intended to include the plural forms as well, unless the context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. It will be further understood that the terms "include," "comprise," and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, embodiments will be described in detail with reference to the accompanying drawings. When describing the embodiments with reference to the accompanying drawings, like reference numerals refer to like components and a repeated description related thereto will be omitted.

FIG. 1 illustrates a configuration of a computing device according to an embodiment.

As illustrated in FIG. 1, a computing device 100 may include at least one processor 110, a memory 130 configured to load a program 140 executed by the processor 110, and a storage 120 configured to store the program 140. Components included in the computing device 100 of FIG. 1 are only an example and one of ordinary skill in the art may know that general-purpose components other than the components illustrated in FIG. 1 may be included.

The processor 110 may control all operations of each component of the computing device 100. The processor 110 may include at least one of a central processing unit (CPU), a microprocessing unit (VIPU), a microcontroller unit (MCU), a graphics processing unit (GPU), or a processor of a random type that is well known in the art. In addition, the processor 110 may perform an operation of at least one application or program for performing a method/operation according to various embodiments of the present disclosure. The computing device 100 may include at least one processor 110.

The memory 130 may store of various kinds of data, instructions, and/or information. The memory 130 may load the program 140 stored in the storage 120 to perform methods/operations according to various embodiments of the present disclosure. The memory 130 may include, for example, random-access memory (RAM) but is not limited thereto.

The storage 120 may non-temporarily store at least one program 140. The storage 120 may include a non-volatile memory such as read-only memory (ROM), erasable programmable ROM (EPROM), electrically erasable programmable ROM (EEPROM), and flash memory, a hard disk drive (HDD), a solid-state drive (SSD), a removable disk, or any other random type of computer-readable storage media that is well known in the art.

The program 140 may include one or more operations in which methods/operations according to various embodiments of the present disclosure are implemented. An operation may correspond to an instruction realized in the program 140. For example, the program 140 may include instructions to cause the processor 110 to perform calculating an energy index according to a predetermined time interval using power consumption data of a specific building, to which an energy storage system (ESS) is applied, during a predetermined period, determining a reward index according to an action of the ESS using a reward function generated based on the energy index, and training a training model to which the reward function is applied through a reward generated based on the reward index.

When the program 140 is loaded in the memory 130, the processor 110 may perform methods/operations according to various embodiments of the present disclosure by executing a plurality of operations for implementing the program 140.

An execution screen of the program 140 may be displayed on a display 150. In FIG. 1, the display 150 is illustrated as a separate device connected to the computing device 100. However, in the computing device 100 such as a user-portable terminal including a smartphone, a tablet, and the like, the display 150 may be a component of the computing device 100. A screen displayed on the display 150 may show a state before information is input to the program 140 or a result of executing the program 140.

FIG. 2 is a diagram illustrating a structure of a reinforcement training technique applied to a training model according to an embodiment.

The reinforcement training technique may generate an action A according to a purpose of reinforcement training in an agent using information collected in an environment and generate a reward R and a new state information S reflecting a change in the environment according to the action. Subsequently, the reinforcement training technique may repeatedly perform the above training process so that a reward value is maximized when an optimal training result eventually satisfies the purpose of the reinforcement training.

In a structure of the reinforcement training according to embodiments, the environment may represent a control management environment of the ESS, the state may represent a date and time, power consumption data of a building, the remaining energy amount of the ESS, the temperature of the ESS, and the like, the action may represent a charging/discharging action of the ESS, and the reward may represent a reward value according to the charging/discharging action of the ESS.

A reinforcement training process and a reward generating method according to the charging/discharging action of the ESS based on the reinforcement training to reduce a peak load of power consumption are described in detail with reference to the drawings below.

FIG. 3 is a flowchart illustrating a reinforcement training process according to an embodiment.

Figure 4:
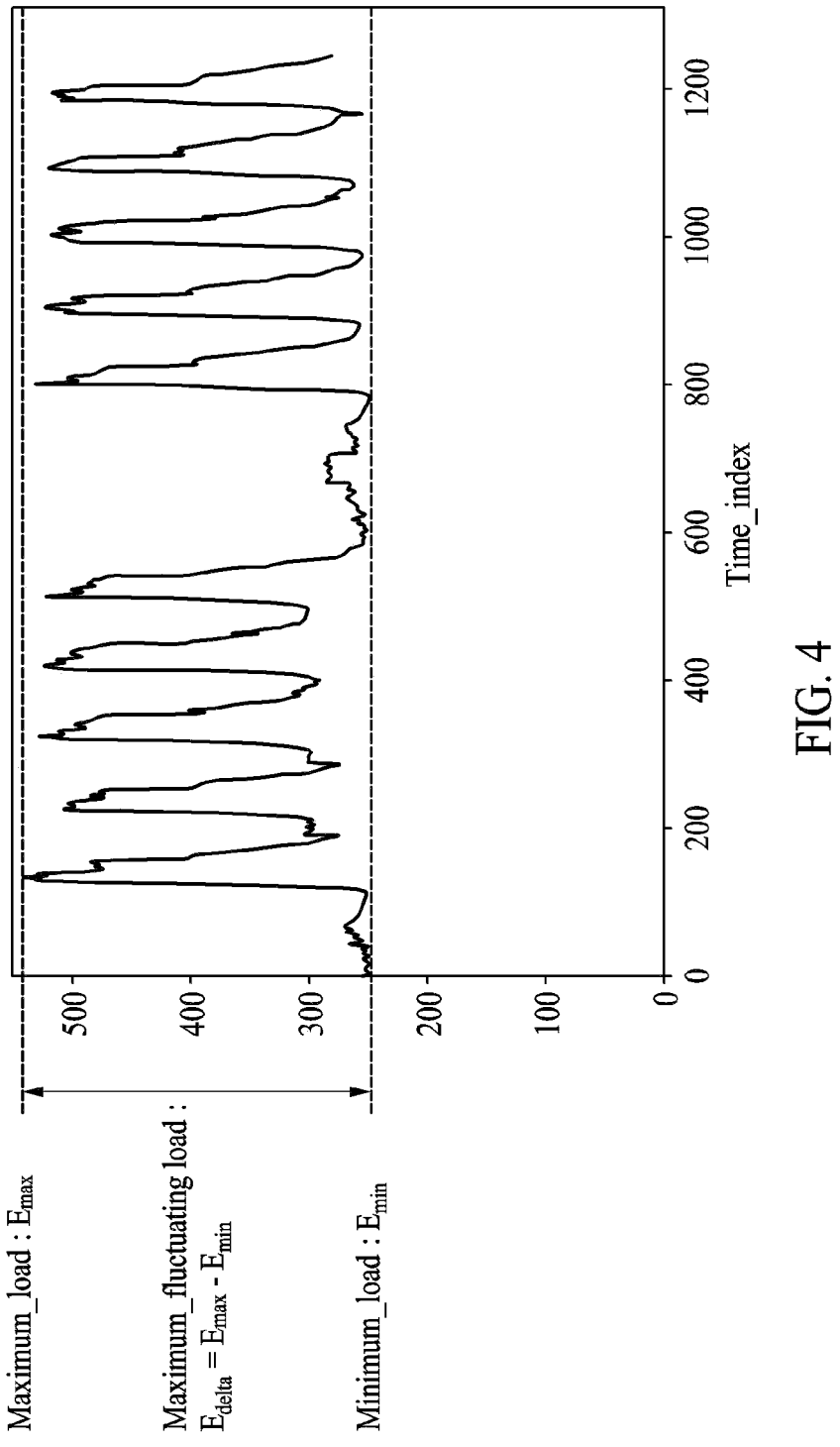
FIG. 4 is a diagram illustrating a maximum load, a minimum load, and a maximum fluctuating load of power consumption data during a predetermined period according to an embodiment.

The reinforcement training process illustrated in FIG. 3 may be performed by the processor 110 of the computing device 100. In operation 102, the processor 110 may determine a maximum fluctuating load $E_{delta}$, which shows a change in size of the power consumption, as in Equation 1 below by identifying a maximum load $E_{max}$ and a minimum load $E_{min}$ during a predetermined period (e.g., a week, a month, a year, and the like) as in FIG. 4, using the power consumption data of the building to which the ESS is applied during the corresponding period.

$$E_{delta}=E_{max}-E_{min} \qquad \text{[Equation 1]}$$

Figure 5:
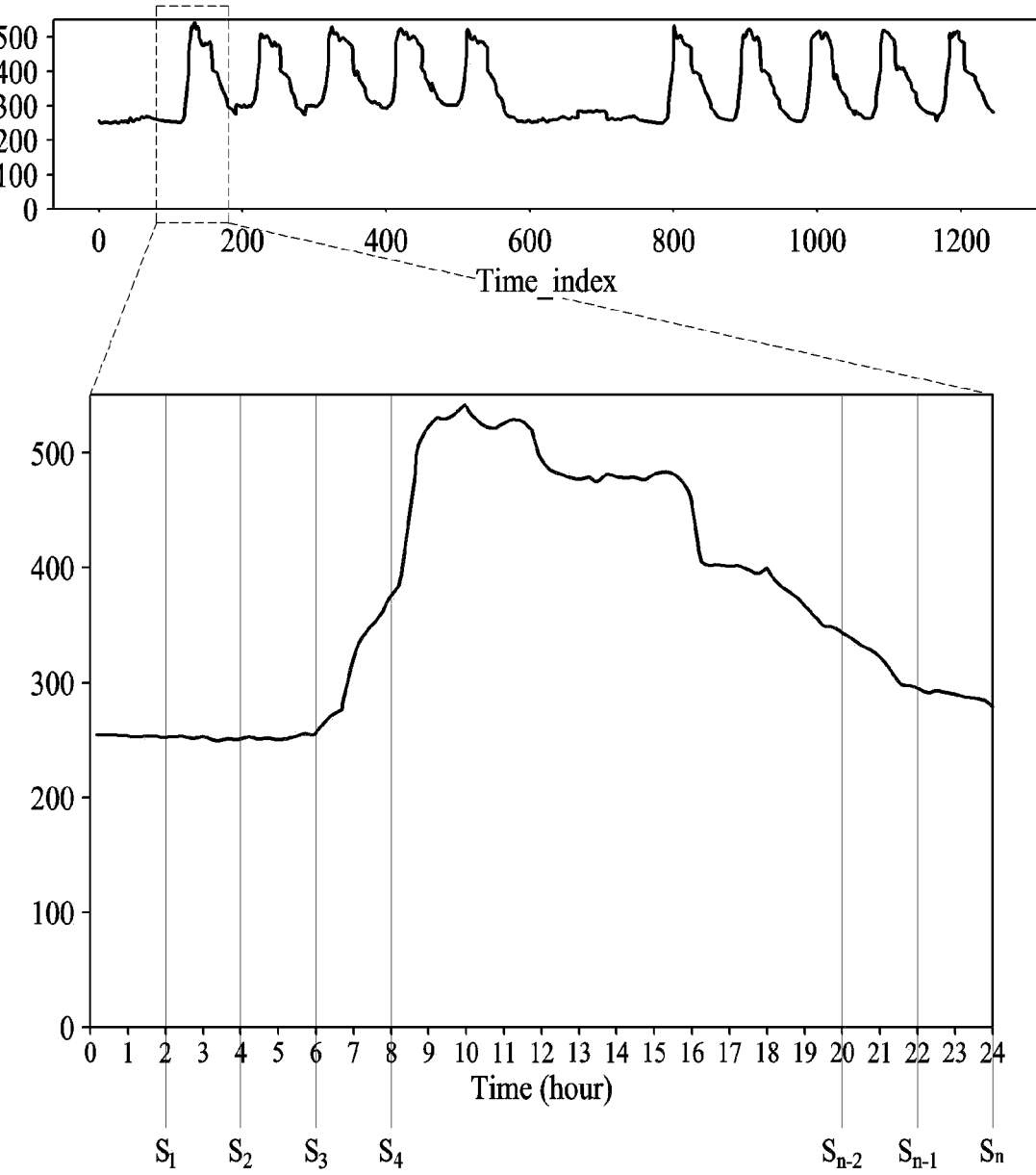
FIG. 5 is a diagram illustrating an example of power consumption data during a predetermined period divided into a daily unit, which is a reference unit, according to an embodiment.

In operation 104, the processor 110 may divide the power consumption data during the predetermined period by a reference unit, which is a cycle of generating a reward according to the control of the ESS, and divide the reference unit by a control time unit, which is a predetermined time interval $\Delta t$, to identify state information $S_1, S_2, \ldots, S_n$ for the control time unit. In an example, FIG. 5 illustrates an example of dividing the power consumption data during the predetermined period by the reference unit of a day and dividing the day into control time units 2H, 4H, 6H, . . . , 24H by the predetermined time interval 2H, consequently identifying the state information $S_1, S_2, \ldots, S_n$.

In operation 106, the processor 110 may calculate energy indexes (EIs), for example, $EI_1, EI_2, \ldots, EI_n$, for the state information $S_1, S_2, \ldots, S_n$ for each control time unit of the reference unit as in Equation 2 below. Here, a range of the EI may be between "0" and "1."

$$EI_i=(E_i-E_{min})/E_{delta} \qquad \text{[Equation 2]}$$

Figure 6:
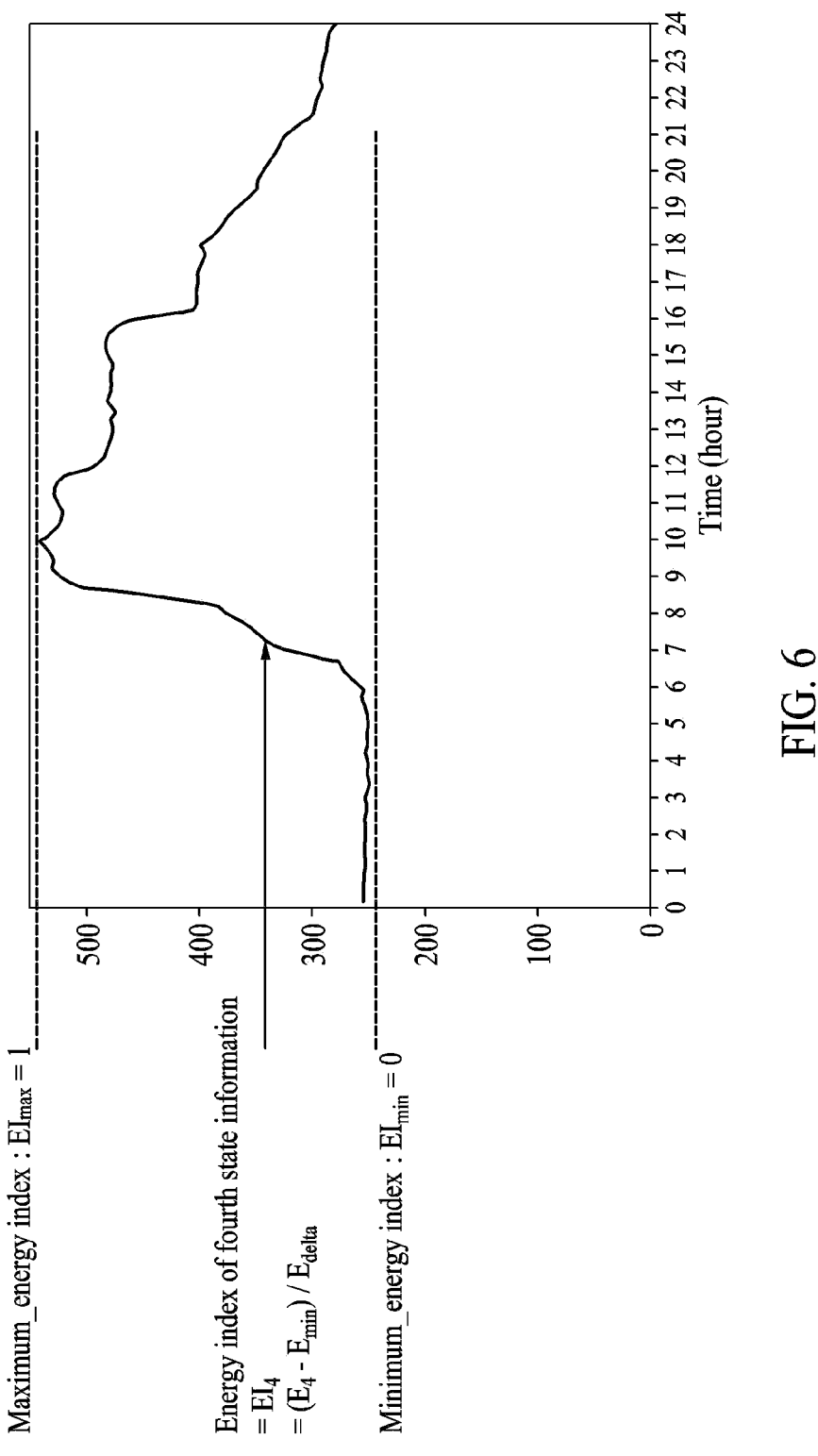
FIG. 6 is a diagram illustrating a method of calculating an energy index for each control time unit of a reference unit, according to an embodiment.

In an example, FIG. 6 illustrates an example of calculating $EI_4$ using power consumption $E_4$ of a state information $S_4$ corresponding to a fourth control time unit 8H in a day, and the minimum load $E_{min}$ and the maximum fluctuating load $E_{delta}$ identified in operation 102.

In operation 108, the processor 110 may set actions $A_1, A_2, \ldots, A_n$ of the ESS based on an output of a reinforcement training model for an input of the state information $S_1, S_2, \ldots, S_n$ for each control time unit of the reference unit. The action of the ESS may include a charging action, a discharging action, and a standby action.

Figure 7:
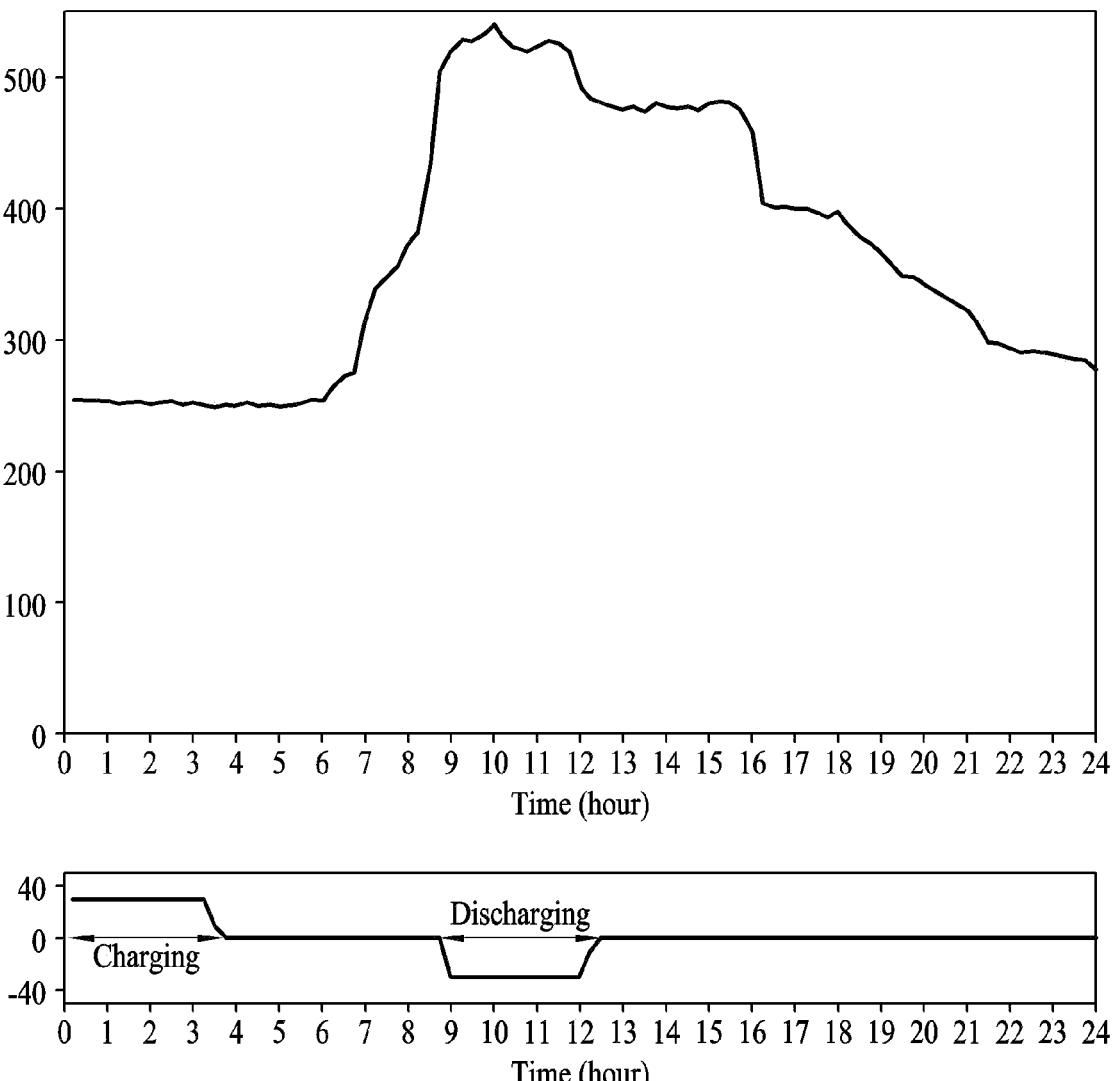
FIG. 7 is a diagram illustrating an example of setting an action of an energy storage system (ESS), which is an output of a reinforcement training model, for each control time unit of a reference unit according to an embodiment.

In an example, referring to FIG. 7, an action of the ESS by the state $S_1$ may be a charging action having an absolute value abs $A_1$, an action of the ESS by the state $S_4$ may be a standby action having an absolute value abs $A_4$, and an action of the ESS by the state $S_5$ may be a discharging action having an absolute value abs $A_5$. Here, the absolute value abs $A_i$ may represent the size of an absolute value excluding a sign of $A_i$.

The charging action of the ESS may mean that the ESS performs charging in the range of 0<abs A≤a maximum charging value during the predetermined time interval $\Delta t$ based on the control time unit. The discharging action of the ESS may mean that the ESS performs discharging in the range of 0<abs A≤a maximum discharging value during a predetermined time interval $\Delta t$ based on the control time unit. The standby action of the ESS may mean that the ESS performs a standby mode and an absolute value abs A=0.

In operation 110, the processor 110 may determine a reward index (RI) according to the action of the ESS using a reward function generated based on the energy index for each control time unit of the reference unit. The processor

110 may generate a reward function to determine a reward index using two methods that are described below.

Figures 8A, 8B:
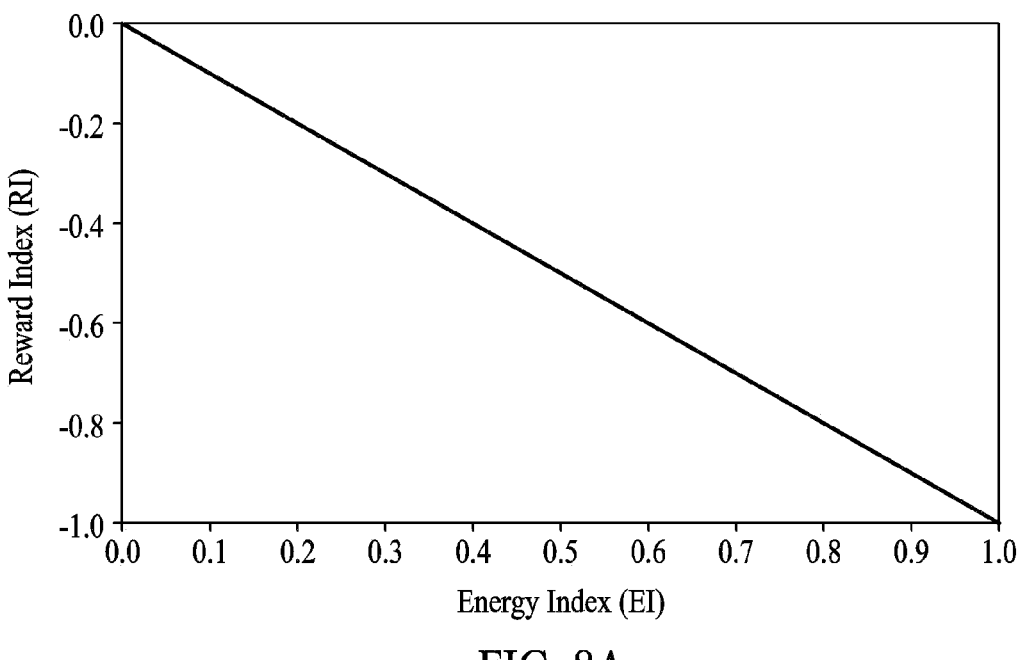
FIGS. 8A and 8B are diagrams illustrating a method of setting a reward index based on a first reward function generation method according to an embodiment.

First, the processor 110 may generate the reward function by setting the reward index so that the charging action of the ESS is a loss and that the discharging action of the ESS is a gain for the energy index as in FIGS. 8A and 8B and determine the reward index according to the same time interval (the control time unit) for calculating the energy index.

More specifically, the processor 110 may generate the reward function by setting the reward index so that the loss of the reward index decreases from 0 to –1 when the energy index increases from 0 to 1 in the charging action of the ESS, that the gain of the reward index increases from 0 to 1 when the energy index increases from 0 to 1 in the discharging action of the ESS, and that the reward index remains at 0 regardless of the energy index in the standby action of the ESS.

Figure 9A:
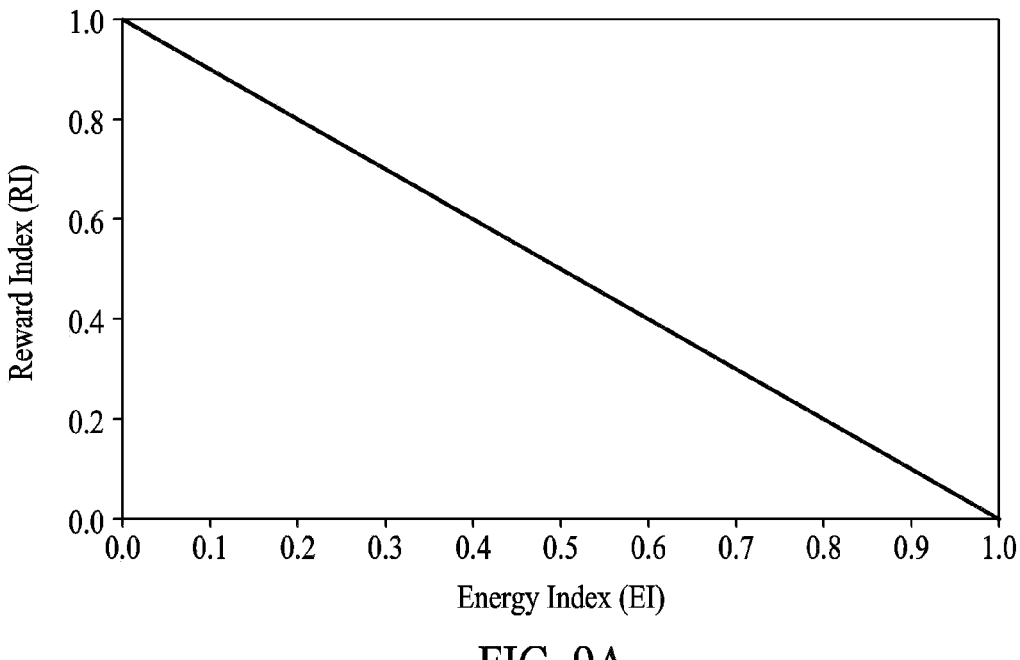
FIGS. 9A and 9B are diagrams illustrating a method of setting a reward index based on a second reward function generation method according to an embodiment.
Figure 9B:
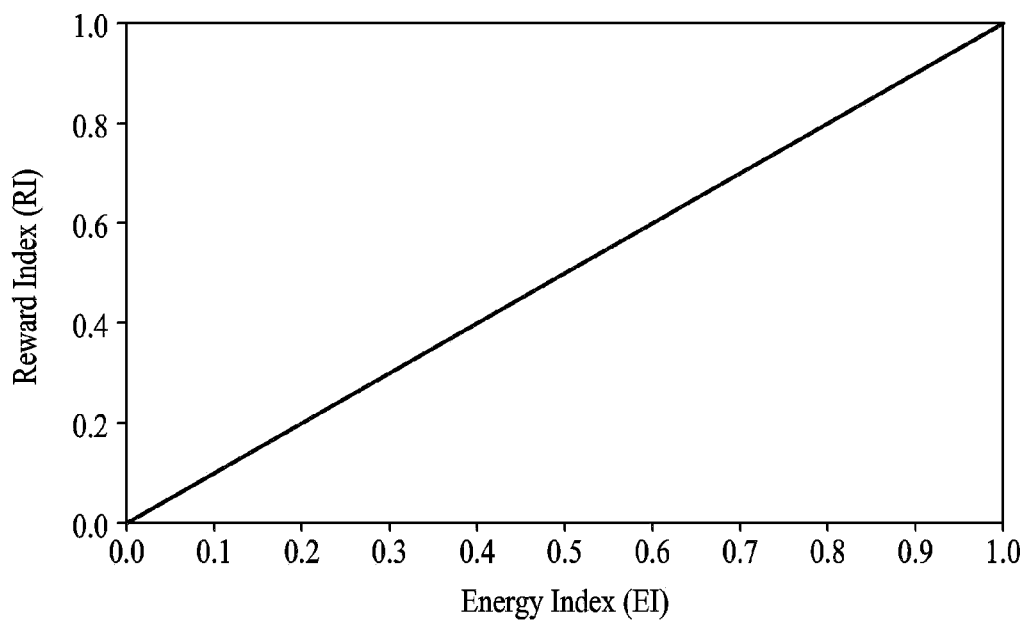

Alternatively, the processor 110 may generate the reward function by setting the reward index so that both the charging action and the discharging action of the ESS are a gain for the energy index as in FIGS. 9A and 9B and determine the reward index according to the same time interval (the control time unit) for calculating the energy index.

More specifically, the processor 110 may generate the reward function by setting the reward index so that the gain of the reward index decreases from 1 to 0 when the energy index increases from 0 to 1 in the charging action of the ESS, that the gain of the reward index increases from 0 to 1 when the energy index increases from 0 to 1 in the discharging action of the ESS, and that the reward index remains at 0 regardless of the energy index in the standby action of the ESS.

Here, in examples of FIGS. 8A and 8B and FIGS. 9A and 9B, the reward functions in which the reward index increases or decreases in the form of a linear function with respect to the EI are provided. However, the form of such a reward function is only an example and may be various forms without being limited thereto.

Figure 10A:
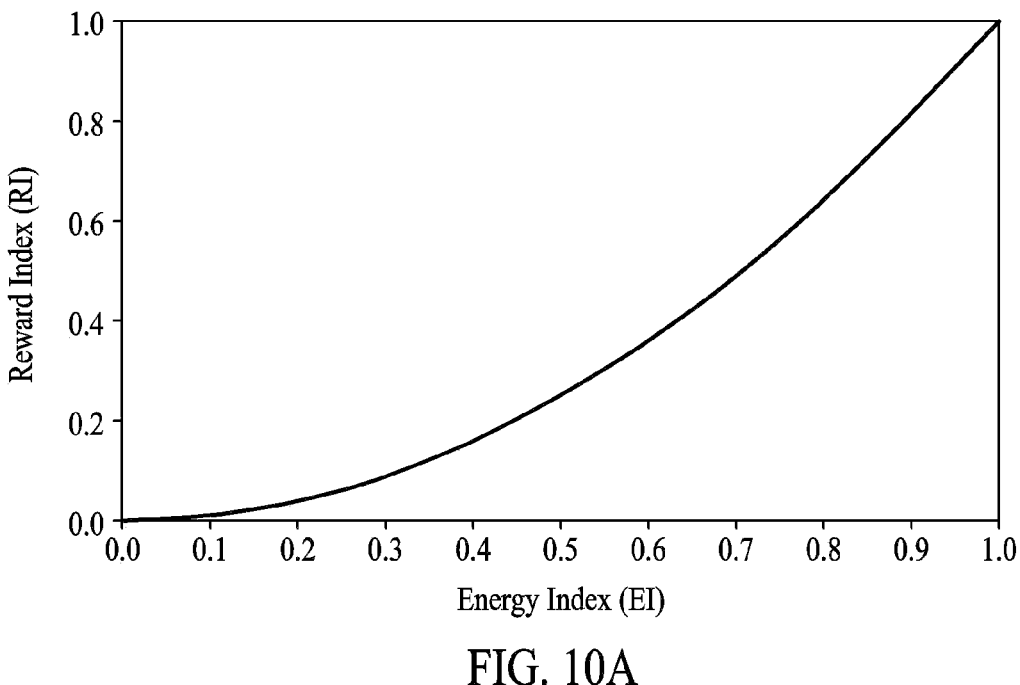
FIGS. 10A and 10B are diagrams illustrating examples of reward functions of various shapes according to an embodiment.
Figure 10B:
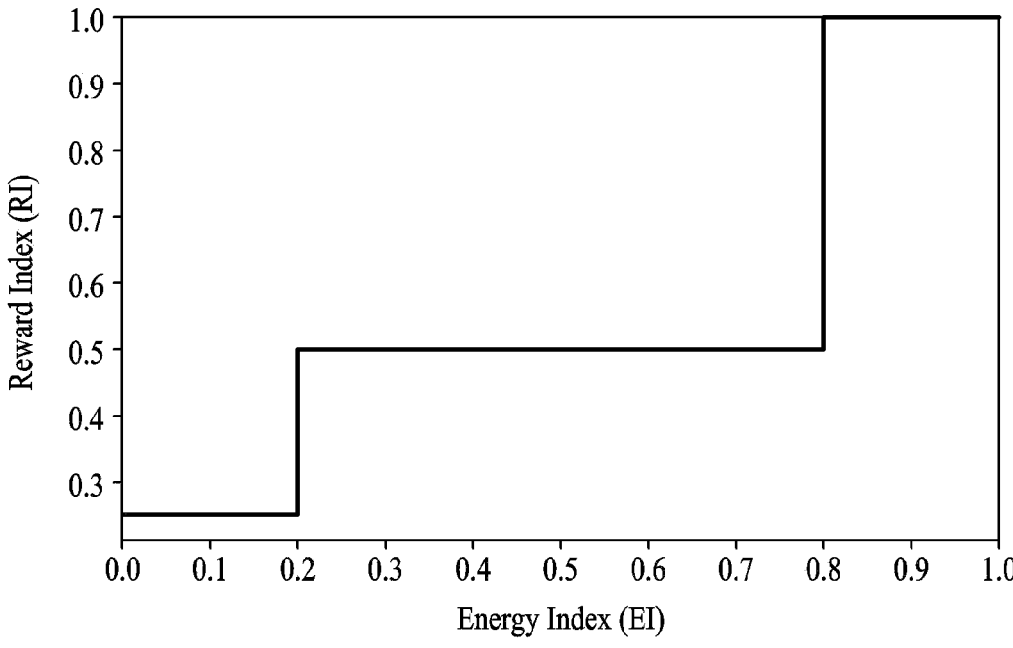

In an example, the form of the reward function may be a form in which the reward index increases/decreases in the form of a quadratic function with respect to the energy index as in FIG. 10A, or a form in which the reward index increases/decreases in the form of a function that allows the reward index to have a different value for each step with respect to the energy index as in FIG. 10B.

In operation 112, the processor 110 may calculate reward values (RVs), for example, $RV_1, RV_2, \ldots, RV_n$, based on the reward indexes for the state information $S_1, S_2, \ldots, S_n$ and the absolute values abs A of the action of the ESS corresponding to the reward indexes for each control time unit of the reference unit, as in Equation 3 below.

$$RV_i=RI_i\times abs(A_i) \qquad \text{[Equation 3]}$$

In operation 114, the processor 110 may generate a reward R for each reference unit by adding all "n" calculated reward values for each control time unit of the reference unit, as in Equation 4 below.

$$R=SUM(RV_1,RV_2,\ldots,RV_n) \qquad \text{[Equation 4]}$$

In operation 116, the processor 110 may train the reinforcement training model for each reference unit so that the reward generated for each reference unit is maximized. Here, a range of the reward generated for each reference unit may be set as in FIGS. 11A and 11B.

Figures 11A, 11B:
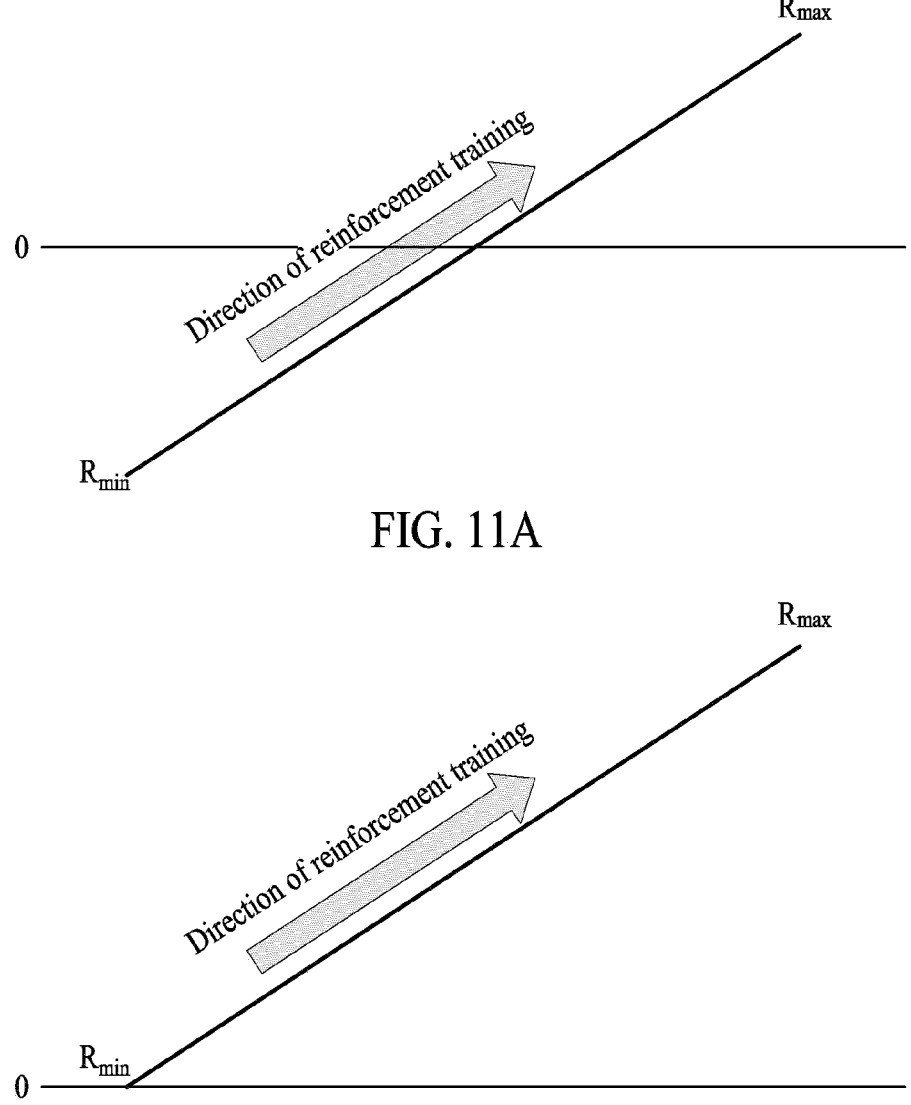
FIGS. 11A and 11B are diagrams illustrating a range of reward generated for each reference unit based on a reward function generation method according to an embodiment.

More specifically, when the reward function is generated by setting the reward index so that the charging action of the ESS is a loss and that the discharging action of the ESS is a gain as in FIG. 11A (using a first reward function generation method), if the loss and the gain due to the charging and discharging of the ESS are not clear, there may be a possibility that the ESS remains in the standby state in which the ESS does not perform any actions. In other words, when the reward index is set using energy consumption information, in some cases, there may be a possibility that the reinforcement training is performed so that the ESS does not perform any actions because the loss and the gain are similar in some cases.

Alternatively, when the reward function is generated by setting the reward index so that both the charging action and the discharging action of the ESS are a gain as in FIG. 11B (using a second reward function generation method), the gain may occur regardless of which action the ESS performs.

Thus, even for the power consumption data based on which the reinforcement training model according to the first reward function generation method learns that it is best for the ESS to not perform any actions, the reinforcement training model according to the second reward function generation method may have a high tendency to learn a best action in a state where the charging and the discharging of the ESS are performed.

In operation 118, the processor 110 may determine whether to repeatedly train the reinforcement training model according to a training termination condition of the reinforcement training model. More specifically, the processor 110 may train the reinforcement training model so that the reward is maximized for all reference units of the power consumption data and may terminate the training of the reinforcement training model. Alternatively, when the reward trained to be maximized for the reference unit does not increase for a predetermined reference unit or longer, the processor 110 may terminate the training of the reinforcement training model.

If the training termination condition of the reinforcement training model is not satisfied, the processor 110 may repeatedly train the reinforcement training model for each reference unit of new power consumption data based on the reinforcement training model that is trained up to a current reference unit.

Figure 12:
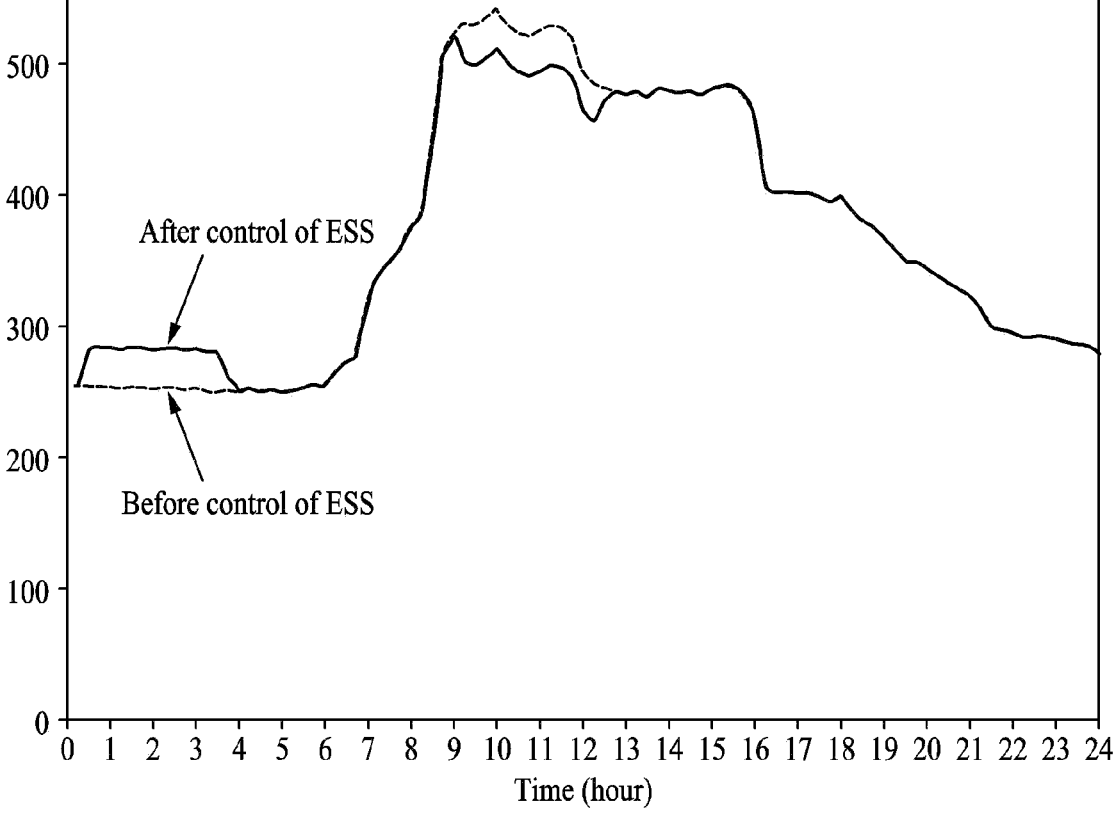
FIG. 12 is a diagram illustrating an example of reduction of a maximum peak for power consumption through control of ESS using a reinforcement training model according to an embodiment.

Finally, in operation 120, the processor 110 may generate optimal control information of the ESS to reduce a maximum peak of power consumption of a building as in FIG. 12, based on action information of the ESS that is output by inputting state information to the reinforcement training model that is trained by applying the reward function.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using hardware components, software components, or a combination thereof. For example, a device, a method, and a component described in the examples may be implemented using one or more general-purpose or special-purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of the processing device is used as singular. However, one skilled in the art will appreciate that the processing device may include multiple processing elements and multiple types of processing elements. For example, the processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network coupled computer systems so that the software is stored and executed in a distributed fashion. The software and data may be stored by one or more non-transitory computer readable recording media.

The method according to the above-described embodiments may be recorded in non-transitory computer-readable media including program instructions to implement various operations which may be performed by a computer. The media may also include the program instructions, data files, data structures, and the like alone or in combination. The program instructions recorded on the media may be those specially designed and constructed for the purposes of the embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as code produced by a compiler, and higher-level code that may be executed by the computer using an interpreter.

The above-described hardware devices may be configured to act as one or more software modules in order to perform the operations of the above-described embodiments, or vice versa.

While this disclosure includes embodiments illustrated with reference to limited drawings, it will be apparent to one of ordinary skill in the art that various changes in form and details may be made in these embodiments without departing from the spirit and scope of the claims and their equivalents. Descriptions of features or aspects in each embodiment are to be considered as being applicable to similar features or aspects in other embodiments. Suitable results may be achieved if the described techniques are performed in a different order, and/or if components in a described system, architecture, device, or circuit are coupled or combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A reward generating method for reducing peak load of power consumption, the method comprising:

calculating an energy index according to a predetermined time interval using power consumption data of a specific building, to which an energy storage system (ESS) is applied, during a predetermined period;

determining a reward index according to an action of the ESS using a reward function generated based on the energy index; and training a training model to which the reward function is applied through a reward generated based on the reward index.

2. The method of claim 1, wherein the determining of the reward index comprises determining the reward index according to a same time interval for calculating the energy index through the reward function generated by setting the reward index so that a charging action of the ESS is a loss and a discharging action of the ESS is a gain, for the energy index.

3. The method of claim 2, wherein the reward function is set so that a loss of the reward index increases when the energy index increases in the charging action of the ESS, that a gain of the reward index increases when the energy index increases in the discharging action of the ESS, and that the reward index remains at 0 regardless of the energy index in a standby action of the ESS.

4. The method of claim 1, wherein the determining of the reward index comprises determining the reward index according to a same time interval for calculating the energy index through the reward function generated by setting the reward index so that both a charging action and a discharging action of the ESS are a gain, for the energy index.

5. The method of claim 4, wherein the reward function is set so that a gain of the reward index decreases when the energy index increases in the charging action of the ESS, that a gain of the reward index increases when the energy index increases in the discharging action of the ESS, and that the reward index remains at 0 regardless of the energy index in a standby action of the ESS.

6. The method of claim 1, wherein the calculating of the energy index comprises calculating an energy index corresponding to a specific time period using a maximum fluctuating load, a minimum load, and power consumption during the specific time period identified in the power consumption data during the predetermined period.

7. The method of claim 1, wherein the training of the training model comprises:

calculating reward values according to the predetermined time interval based on the reward index determined according to the predetermined time interval and an absolute value of the action of the ESS corresponding to the determined reward index;

generating a reward for each reference unit by dividing and adding the calculated reward values according to the reference unit; and repeatedly training the training model so that the reward generated for each reference unit is maximized.

8. The method of claim 7, wherein the repeated training of the training model comprises training the training model so that all rewards generated for each reference unit are maximized and terminating the training of the training model.

9. The method of claim 7, wherein the repeated training of the training model comprises, when the reward trained to be maximized through the training model does not increase for a predetermined reference unit, terminating the training of the training model.

10. The method of claim 1, further comprising:

generating optimal control information of the ESS to reduce a maximum peak of the power consumption of the specific building, based on action information of the ESS that is output by inputting state information to the trained training model to which the reward function is applied, wherein the state information comprises information about at least one of date and time, the power consumption data of the specific building, a remaining energy amount of the ESS, or a temperature of a region where the ESS is located.

11. A computing device comprising:

a processor;

a memory configured to load a program executed by the processor; and a storage configured to store the program, wherein the program comprises instructions to cause the processor to perform calculating an energy index according to a predetermined time interval using power consumption data of a specific building, to which an energy storage system (ESS) is applied, during a predetermined period, determining a reward index according to an action of the ESS using a reward function generated based on the energy index, and training a training model to which the reward function is applied through a reward generated based on the reward index.

12. The computing device of claim 11, wherein the processor is configured to determine the reward index according to a same time interval for calculating the energy index through the reward function generated by setting the reward index so that a charging action of the ESS is a loss and a discharging action of the ESS is a gain, for the energy index.

13. The computing device of claim 12, wherein the reward function is set so that a loss of the reward index increases when the energy index increases in the charging action of the ESS, that a gain of the reward index increases when the energy index increases in the discharging action of the ESS, and that the reward index remains at 0 regardless of the energy index in a standby action of the ESS.

14. The computing device of claim 11, wherein the processor is configured to determine the reward index according to a same time interval for calculating the energy index through the reward function generated by setting the reward index so that both a charging action and a discharging action of the ESS are a gain for the energy index.

15. The computing device of claim 14, wherein the reward function is set so that a gain of the reward index decreases when the energy index increases in the charging action of the ESS, that a gain of the reward index increases when the energy index increases in the discharging action of the ESS, and that the reward index remains at 0 regardless of the energy index in a standby action of the ESS.

16. The computing device of claim 11, wherein the processor is configured to calculate an energy index corresponding to a specific time period using a maximum fluctuating load, a minimum load, and power consumption during the specific time period identified in the power consumption data during a predetermined period.

17. The computing device of claim 11, wherein the processor is configured to calculate reward values according to the predetermined time interval based on the reward index determined according to the predetermined time interval and an absolute value of the action of the ESS corresponding to the determined reward index, generate a reward for each reference unit by dividing and adding the calculated reward values according to the reference unit, and repeatedly train the training model so that the reward generated for each reference unit is maximized.

18. The computing device of claim 17, wherein the processor is configured to train the training model so that all rewards generated for each reference unit are maximized and terminate the training of the training model.

19. The computing device of claim 17, wherein the processor is configured to, when the reward trained to be maximized through the training model does not increase for a predetermined reference unit, terminate the training of the training model.

20. The computing device of claim 11, wherein the processor is configured to generate optimal control information of the ESS to reduce a maximum peak of the power consumption of the specific building, based on action information of the ESS that is output by inputting state information to the trained training model to which the reward function is applied, wherein the state information comprises information about at least one of date and time, the power consumption data of the specific building, a remaining energy amount of the ESS, or a temperature of the region where the ESS is located.

* * * * *